(12) United States Patent
Yuan et al.

(10) Patent No.: US 7,884,800 B2
(45) Date of Patent: Feb. 8, 2011

(54) LEFT/RIGHT HAND OPERATED SENSING INTELLIGENT MOUSE

(75) Inventors: Yong Yuan, Guangdong (CN); Shih-Fang Wong, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1075 days.

(21) Appl. No.: 11/617,728

(22) Filed: Dec. 29, 2006

(65) Prior Publication Data

US 2007/0216647 A1 Sep. 20, 2007

(30) Foreign Application Priority Data

Mar. 17, 2006 (CN) .................. 2006 1 0034543

(51) Int. Cl.
*G09G 5/08* (2006.01)
(52) U.S. Cl. ...................................... 345/163
(58) Field of Classification Search ............... None
See application file for complete search history.

(56) References Cited

U.S. PATENT DOCUMENTS 5,841,425 A * 11/1998 Zenz, Sr. .................. 345/163

\* cited by examiner

*Primary Examiner*—Sumati Lefkowitz
*Assistant Examiner*—Tammy Pham
(74) *Attorney, Agent, or Firm*—Winston Hsu; Scott Margo

(57) ABSTRACT

A mouse includes a left button, a right button, a touch sensing unit and a processing unit. The left button and the right button generate click signals in response to click operations. The touch sensing device generates touch positional signals when the left or right button is touched. The processing unit is used to receive the touch positional signals, calculate y-coordinate values of all points in the touched areas; select two significant points respectively from the left touched area and the right touched area; compare the y-coordinate values of the two significant points to generate a comparison result; confirm a current operated mode; if the confirmed operated mode is a left handed operation, send a control signal with a left-button identifier to a computer configured therewith; if the confirmed operated mode is a right handed operation, send a control signal with a right-button identifier to the computer configured therewith.

10 Claims, 4 Drawing Sheets

LEFT/RIGHT HAND OPERATED SENSING INTELLIGENT MOUSE

BACKGROUND OF THE INVENTION

1. Field of the Invention

The invention relates to a mouse, and more particularly, to a mouse that can automatically identify if it is being left hand operated or right hand operated.

2. Description of Related Art

A computer mouse is an input device of a computer. Depending on the configuration of an Operating System of the computer, the computer mouse may have one or more operational buttons. Computer mice with more than one operational buttons generally have a left button and a right button for generating click signals in response to click operations.

Humans are cognitive symmetrical when it comes to cognitive association, i.e., the human brain associates the index finger on the right hand to the index finger on the left hand. Thus, a right handed computer user would associate the index finger (innermost finger) to the left button of the mouse and the middle finger (outermost finger) to the right button of the mouse and not the leftmost finger nor the rightmost finger. When the right arm of a right handed computer user is tired or not free and needs to use the left hand to control the computer mouse, due to the cognitive association, will tend to press the left button of the mouse with the middle finger of the left hand for a right button operation and vice versa. The same is true for left handed computer users.

Although the mouse button functions can be reconfigured in the Operating System to adapt the switch of right hand to the left hand, reconfiguring the Operating System every time is very troublesome and inconvenient.

Therefore, a heretofore unaddressed need exists in the industry to overcome the aforementioned deficiencies and inadequacies.

SUMMARY OF THE INVENTION

In order to solve said problems, the present invention provides a mouse that can automatically identify if it is being left hand operated or right hand operated. The present invention can detect the hand that is using the mouse, thereby automatically switch to a corresponding operated mode to adapt to the hand.

The mouse includes a left button, a right button, a touch sensing device and a processing unit. The left button and the right button generate click signals in response to click operations. The touch sensing device generates touch positional signals when the left or right button is touched. The processing unit is used to receive the touch positional signals generated by the touch sensing unit and determines positions of a left touched area on the left button and a right touched area on the right button, calculate y-coordinate values of all points in the touched areas after receiving click signals generating by the left button and the right button in response to click operations; select two significant points respectively from the left touched area and the right touched area; compare the y-coordinate values of the two significant points to generate a comparison result; confirm a current operated mode according to the comparison result; if the confirmed operated mode is a left handed operation, send a control signal with a left-button identifier to a computer configured therewith; if the confirmed operated mode is a right handed operation, send a control signal with a right-button identifier to the computer configured therewith.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

The mouse of the present invention is capable of automatically identifying if it is being left hand operated or right hand operated, and further switching to a corresponding operational mode accordingly. The mouse may be any appropriate mouse such as, for example, a photoelectric mouse, a mechanical mouse, a laser mouse, and so on. The following detailed description of the embodiment is made with reference to the attached drawings.

Figure 1:
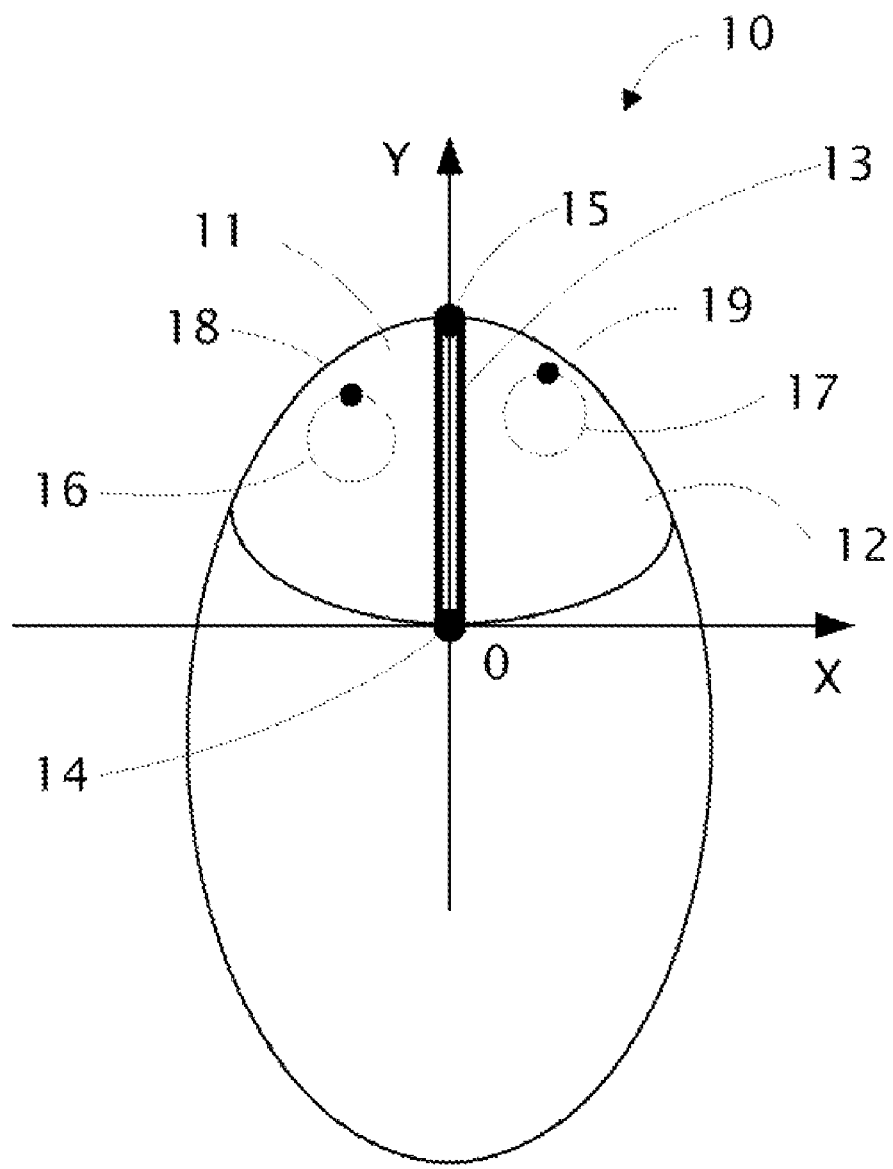
FIG. 1 is a planar view of a left/right-hand operated sensing intelligent mouse in accordance with a preferred embodiment of the present invention.

FIG. 1 is a planar view of a mouse for automatically identifying if it is being left hand operated or right hand operated in accordance with the preferred embodiment of the present invention. The mouse 10 includes a left button 11 and a right button 12 at the front of the mouse. The left button 11 and the right button 12 share a boundary line 13. The boundary line 13 has a start point 14 and an end point 15. The left button 11 and the right button 12 are capable of generating click signals in response to click operations. When operated, for example, an area of the right button 12 that is touched by the operator is defined as a right touched area 17 and an area of the left button 11 that is touched by the operator is defined as a left touched area 16. A significant point 18 is selected from all points of the left touched area 16 and a significant point 19 is selected from all points of the right touched area 17 by calculation and comparison. For example, the significant point 18 is the point that has a maximum y-coordinate value among all the points of the left touched area 16, and the significant point 19 is the point that has a maximum y-coordinate value among all the points of the right touched area 17. However, in other cases, the significant points 18, 19 can have a minimum y-coordinate value among all the points in the touched areas 16, 17.

Since the middle finger of is longer than the index finger, when the mouse 10 is right hand operated with an index finger and a middle finger, the significant point 19 in the right touched area 17 is further away than the significant point 18 in the left touched area 16. By comparing which of the left significant point 18 and the right significant point 19 is further away, the mouse 10 can identify if it is being left hand operated or right hand operated.

In the preferred embodiment, for simplicity, the boundary line 13 is defined as a y axis, and a point such as the start point 14 on the boundary line 13 is set as a center to establish an x-y coordinate system such as that shown in FIG. 1. The left button 11 and the right button 12 of the mouse 10 are usually operated with the index finger and the middle finger. The index finger is shorter than the middle finger, so the maximum y-coordinate value of all the points in the left touched area 16 is smaller than that of all the points in the right touched area 17 when operating the mouse 10 with the right hand. That is, the y-coordinate of the significant point 18 is less than that of the significant point 19.

Figure 2:
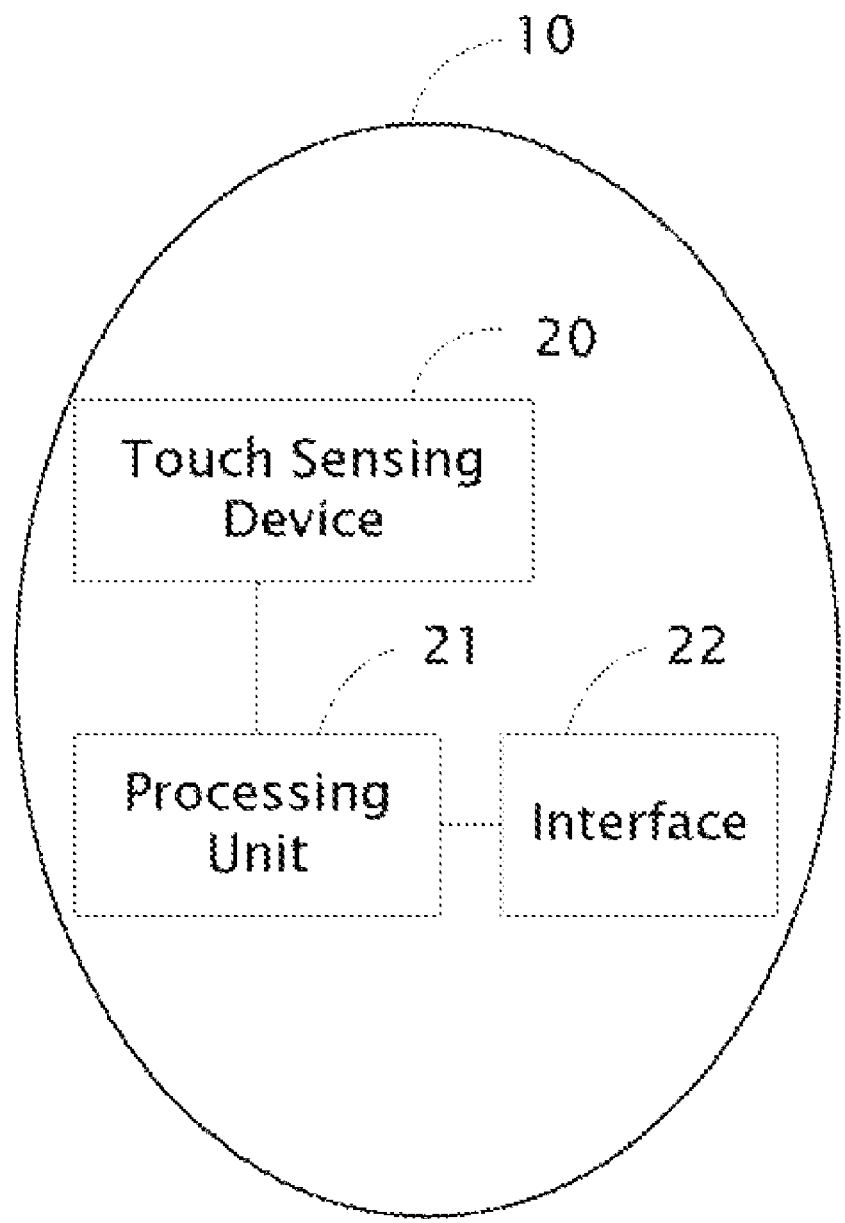
FIG. 2 is a block diagram of a hardware infrastructure of the mouse of FIG. 1.

FIG. 2 is a block diagram of a hardware infrastructure of the mouse 10 of FIG. 1. The mouse 10 includes a touch sensing device 20, a processing unit 21, and an interface 22. The interface 22 is configured to connect the mouse 10 to a computer (not shown). The interface 22 may be a USB (Universal Serial Bus) interface, a wireless transmission interface, a blue-tooth interface, a PS/2 (Personal System/2) interface, or any other data transmission interface. The touch sensing device 20 may be a touch panel, a touch screen, or any other type touch-sensitive device. The touch sensing device 20 is disposed beneath the left button 11 and the right button 12, and is divided into many touch sensing units and each of the touch sensing units is configured to generate a touch positional signal when it is touched. In other cases, the mouse 10 can have two touch sensing devices 20, one of which corresponds to the left button 11 and the other corresponds to the right button 12.

After receiving the click signals generated by the left button 11 or the right button 12, the processing unit 21 further receives the touch positional signals generated by the touch sensing device 20 and computes positions of the left touched area 16 on the left button 11 and of the right touched area 17 on the right button 12, computes and analyzes all the points in the touched areas 16 and 17 to obtain the left significant point 18 and the right significant point 19. The processing unit 21 computes a comparison result between the y-coordinate value of the left significant point 18 and the y-coordinate value of the right significant point 19, identifies if the mouse is in a left hand operated mode or in a right hand operated mode according to the comparison result and further detects a current operated mode.

After 21 identifies if the mouse is left hand operated or right hand operated, the processing unit 21 generates a control signal according to the current operated mode, and sends the control signal to the computer connected, the computer then determines the current operated mode automatically.

For example, if the mouse is in the right handed operated mode, the processing unit 21 sends the control signal assigned with a left-button identifier (e.g. "010") in response to the click operation from the left button 11, alternatively, sends the control signal assigned with a right-button identifier (e.g. "001") in response to the click operation from the right button 12. In the left handed operated mode, the processing unit 21 sends the control signal assigned with the right-button identifier (e.g. "001") in response to the click operation from the left button 11, alternatively, sends the control signal assigned with the left-button identifier (e.g. "010") in response to the click operation from the right button 12.

Figure 3:
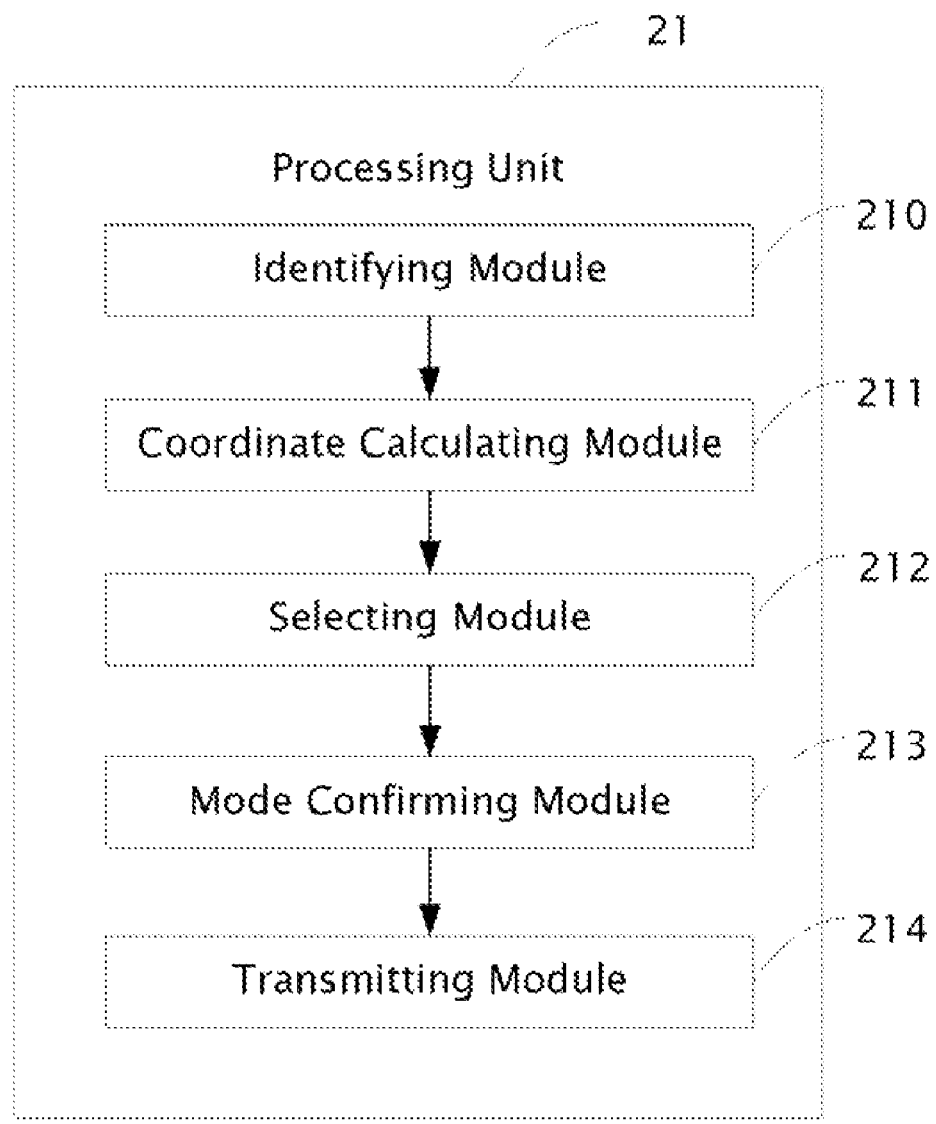
FIG. 3 is a function module diagram of a processing unit of the mouse of FIG. 2.

FIG. 3 is a function module diagram of the processing unit 21. The processing unit 21 includes an identifying module 210, a calculating module 211, a selecting module 212, a mode confirming module 213, and a transmitting module 214. The identifying module 210 receives the touch positional signals generated by the touch sensing device 20 and determines the left touched area 16 on the left button 11 and the right touched area 17 on the right button 12.

The calculating module 211 receives the click signals generated by the left button 11 and the right button 12 in response to click operations, and then calculates y-coordinate values of all the points in the left touched area 16 and the right touched area 17.

The selecting module 212 selects the two significant points 18, 19 respectively from the left touched area 16 and the right touched area 17, compares the y-coordinate values of the two significant points 18, 19, and generates a comparison result.

The mode confirming module 213 determines if the current operated mode is in the left handed operated mode or in the right handed operated mode according to the comparison result.

The transmitting module 214 generates the control signal according to the current operated mode, and sends the control signal to the computer connected.

Figure 4:
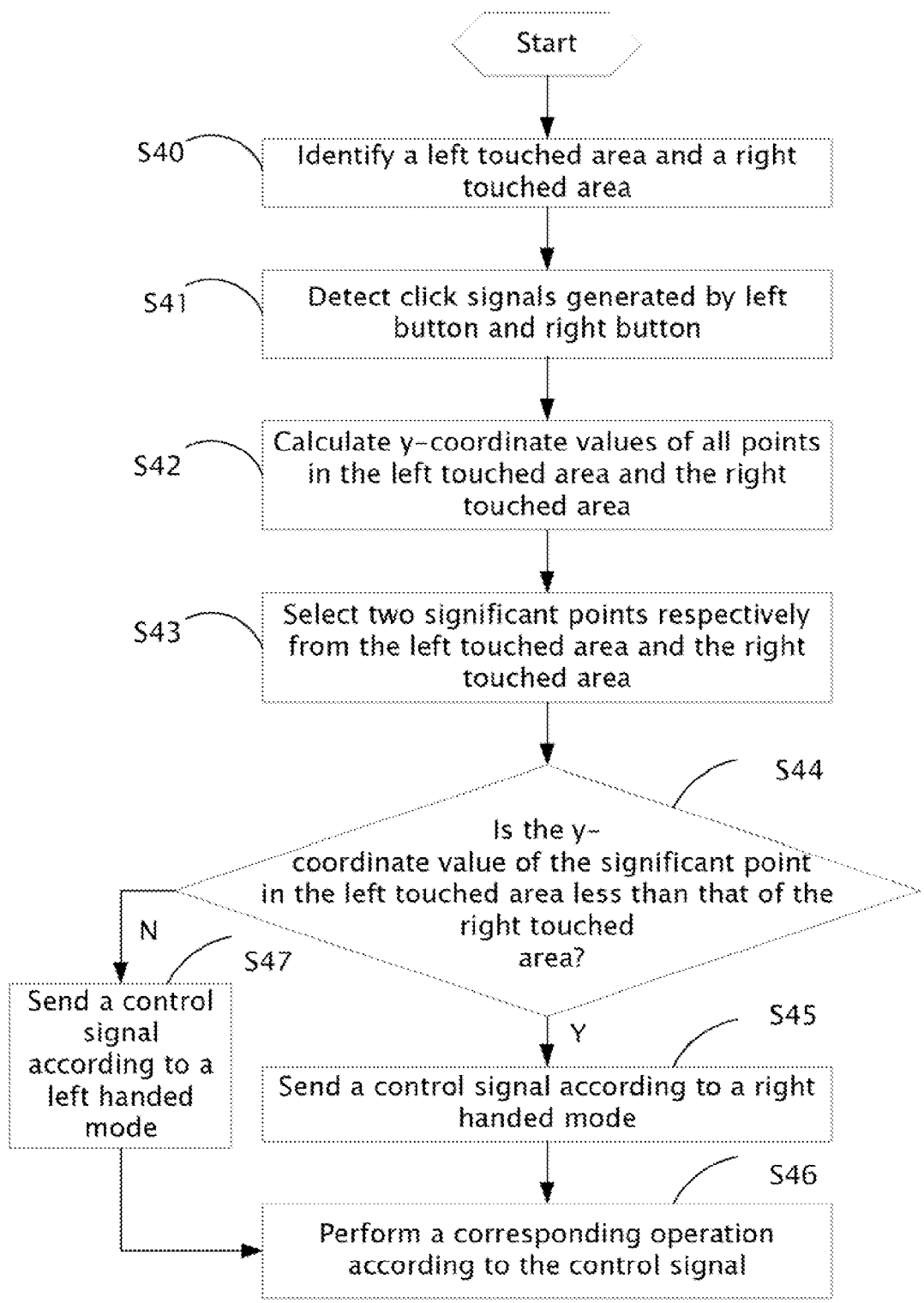
FIG. 4 is a flow chart of a preferred method for automatically identifying if it is being left hand operated or right hand operated.

FIG. 4 is a flow chart of a preferred method for automatically identifying if it is being left hand operated or right hand operated. In step S40, the processing unit 21 receives the touch positional signals generated by the touch sensing device 20 and determines positions of the left touched area 16 on the left button 11 and the right touched area 17 on the right button 12.

In step S41, the processing unit 21 receives the click signals generated by the left button 11 or the right button 12 in response to the click operations.

In step S42 the processing unit 21 calculates the y-coordinate values of all the points in the left touched area 16 and all the points of the right touched area 17.

In step S43, the processing unit 21 selects the significant points 18 among all the points in the left touched area 16 and the significant points 19 among all the points in the right touched areas 17 respectively.

In step S44, the processing unit 21 compares the y-coordinate values of the significant points 18, 19, and determines whether the y-coordinate value of the significant point 18 is smaller than that of the significant point 19.

In step S45, if the y-coordinate value of the significant point 18 is smaller than that of the significant point 19, the processing unit 21 sends the control signal corresponding to the click operation to the computer according to the right handed operated mode, that is, the processing unit 21 sends the control signal assigned with the left-button identifier (e.g. "010") in response to the click operation from the left button 11, and sends the control signal with the right-button identifier (e.g. "001") after receiving the click operation from the right button 12.

If the y-coordinate value of the significant point 18 is equal to or greater than that of the significant point 19, in step S47, the processing unit 21 sends the control signal corresponding to the click operation to the computer according to the left handed operated mode, that is, the processing unit 21 sends the control signal assigned with the right-button identifier (e.g. "001") in response to the click operation from the right button 12, and sends the control signal with the left-button identifier (e.g. "010") after receiving the click operation generated by the left button 11.

In step S46, the computer receives the control signal generated by the processing unit 21 via the interface 22, and performs a corresponding operation according to the control signal.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. A left/right hand operated sensing intelligent mouse comprising:
   a left button and a right button for generating click signals in response to click operations;

a touch sensing device for generating touch positional signals when the left or right button is touched; and a processing unit comprising:

an identifying module for receiving the touch positional signals generated by the touch sensing unit and determining positions of a left touched area on the left button and a right touched area on the right button;

a calculating module for calculating y-coordinate values of all points in the touched areas after receiving click signals generating by the left button and the right button in response to click operations;

a selecting module for selecting two significant points respectively from the left touched area and the right touched area, comparing the y-coordinate values of the two significant point, and generating a comparison result, wherein the significant point is a point with a maximal or minimal y-coordinate value of all points in the left touched area or the right touched area and a mode confirming module for determining a current operated mode to be a left handed operated mode or a right handed operated mode according to the comparison result;

a transmission module for generating a control signal according to the current operated mode determined, and sending the control signal to the computer connected therewith;

wherein if the y-coordinate value of the significant point in the left touched area is smaller than the y-coordinate value of the significant point in the right touched area, the mode confirming module determines a current operated mode is the right handed operated mode.

2. The mouse according to claim 1, wherein in the right handed operated mode, the processing unit sends the control signal with a left-button identifier after receiving the click operation from the left hand, and sends the control signal with a right-button identifier after receiving the click operation from the right hand.

3. The mouse according to claim 1, wherein an boundary line between the left button and the right button is set as a y-coordinate axis, a point on the boundary line is set as a center to establish a x-y coordinate system.

4. The mouse according to claim 3, wherein the center of the x-y coordinate system is a start point of the boundary line.

5. The mouse according to claim 3, wherein the center of the x-y coordinate system is an end point of the boundary line.

6. A left/right hand operated sensing intelligent mouse comprising:

a left button and a right button for generating click signals in response to click operations;

a touch sensing device for generating touch positional signals when the left or right button is touched; and a processing unit comprising:

an identifying module for receiving the touch positional signals generated by the touch sensing unit and determining positions of a left touched area on the left button and a right touched area on the right button;

a calculating module for calculating y-coordinate values of all points in the touched areas after receiving click signals generating by the left button and the right button in response to click operations;

a selecting module for selecting two significant points respectively from the left touched area and the right touched area, comparing the y-coordinate values of the two significant point, and generating a comparison result, wherein the significant point is a point with a maximal or minimal y-coordinate value of all points in the left touched area or the right touched area;

a mode confirming module for determining a current operated mode to be a left handed operated mode or a right handed operated mode according to the comparison result; and a transmission module for generating a control signal according to the current operated mode determined, and sending the control signal to the computer connected therewith;

wherein if the y-coordinate value of the significant point in the left touched area is equal to or greater than the y-coordinate value of the significant point in the right touched area, the mode confirming module determines the current operated mode is the left handed operated mode.

7. The mouse according to claim 6, wherein in the left handed operated mode, the processing unit sends the control signal with a right-button identifier after receiving the click operation from the left hand, and sends the control signal with a left-button identifier after receiving the click operation from the right hand.

8. The mouse according to claim 6, wherein an boundary line between the left button and the right button is set as a y-coordinate axis, a point on the boundary line is set as a center to establish a x-y coordinate system.

9. The mouse according to claim 8, wherein the center of the x-y coordinate system is a start point of the boundary line.

10. The mouse according to claim 8, wherein the center of the x-y coordinate system is an end point of the boundary line.

* * * * *